United States Patent [19]

Müller

[11] Patent Number: 5,198,079

[45] Date of Patent: Mar. 30, 1993

[54] CONSTRUCTION AND WAY OF OPERATION OF A GAS DIFFUSION ELECTRODE FOR THE ELECTROCHEMICAL DISCOVERY OF MATERIALS FROM AQUEOUS SOLUTIONS

[76] Inventor: Jürgen Müller, Am Kirchfeld 8, 6367 Karben 2, Fed. Rep. of Germany

[21] Appl. No.: 521,254

[22] Filed: May 9, 1990

[30] Foreign Application Priority Data

Jun. 2, 1989 [DE] Fed. Rep. of Germany ....... 3918378

[51] Int. Cl.$^5$ .................. C25B 1/14; C25B 11/00; C25C 1/00
[52] U.S. Cl. ................... 204/98; 204/105 R; 204/128; 204/114; 204/105 M; 204/112; 204/120; 204/283; 204/280
[58] Field of Search ........... 204/290 R, 283, 284, 204/286, 282, 280, 105 R, 98, 128, 129, 106, 109, 108, 118, 112, 120, 114, 105 M; 429/40, 44

[56] References Cited

U.S. PATENT DOCUMENTS

| | | | |
|---|---|---|---|
| 3,793,165 | 2/1974 | Juda | 204/263 |
| 4,115,237 | 9/1978 | Woodard, Jr. et al. | 204/282 |
| 4,329,217 | 5/1982 | Byrd et al. | 204/282 |
| 4,412,894 | 11/1983 | Juda | 204/119 |
| 4,435,267 | 3/1984 | Batzold et al. | 204/284 |
| 4,614,575 | 9/1986 | Juda et al. | 204/265 |
| 4,663,003 | 5/1987 | de Nora et al. | 204/283 |

Primary Examiner—John Niebling
Assistant Examiner—Kathryn Gorgos

[57] ABSTRACT

An easy-to-disassemble vertical gas diffusion electrode, assembly of sandwich type construction is provided with a gas feed tube to the highest point and a discharge line from the lowest point of the electrode and is operated with its gas chamber held under a weak vacuum.

5 Claims, No Drawings

CONSTRUCTION AND WAY OF OPERATION OF A GAS DIFFUSION ELECTRODE FOR THE ELECTROCHEMICAL DISCOVERY OF MATERIALS FROM AQUEOUS SOLUTIONS

BACKGROUND OF THE INVENTION

1. Field of the Invention

A gas diffusion electrode can be both an anode or a cathode. If an anode of this type operated on hydrogen is connected against a cathode operated on air or oxygen, a system of that type constitutes a fuel cell. Semi-cells of this technology are suitable as electrodes for the recovery of materials from aqueous solutions. If the fuel gas of the diffusion electrode is oxygen, the electrode is a cathode that can be employed, for example, in the chloralkali electrolysis, recovering energy by reaction of the normally developing hydrogen with oxygen as demonstrated by a decreased cell voltage.

If the fuel gas is hydrogen, the electrode is hydrogen diffusion anode hereinafter referred to as HDA.

2. Description of the Related Art

As shown in the referenced U.S. Pat. Nos. 4,412,894; 4,614,575; and 3,793,165, incorporated herein by reference, basically, the construction of an HDA is as follows: Hydrogen is supplied to a catalyst conductively connected to a metal structure, with solid-liquid-gas hydrogen ions developing on the three-phase limit and enabling current to flow in the event of the presence of a cathode, with voltage applied. This reaction can be used, for example, to operate a zinc-metal recovery electrolysis, with employment of an HDA resulting in a voltage decrease of 1.5 to 1.8 V as compared with a conventional zinc recovery electrolysis meaning 50% savings in electric energy.

This voltage gain, on the one hand, results from the formation enthalpy of the oxy-hydrogen reaction (theoretically, 1.23 V) and the elimination of the overvoltage of the oxygen normally developed on the anode, on the other hand.

The technological application of this reaction known for a long time from the fuel cell technology to the metal recovery electrolysis is faced with a multiplicity of practical difficulties. Conventionally built cells are relatively sensitive vis-à-vis hydrogen gas pressure fluctuations. Though possibly required, it is extremely problematic to repair the plastic membrane, i.e. the separating member between gas chamber and catalyst on the one hand and electrolyte, on the other. The conductive cementation between catalyst carrier and anode metal construction which is still required, constitutes a weak point of the process.

SUMMARY

An easy-to-disassemble vertical gas diffusion electrode assembly of sandwich-type construction is described. The major components of which are the electrode sheet serving as an electronic conductor, graphite fabric, catalyst carrier along with catalyst, a hydrophilic, microporous separator, a gas supply tube to the highest point and a discharge line from the deepest point, and the gas chamber held under a week vacuum. This electrode, depending on the fuel gas (hydrogen or oxygen) can be an anode or cathode. This electrode can be used as a cathode in the cloralkali electrolysis while it can be used as a anode in the metal recovery from aqueous solutions.

The object of these electrodes is to insure a decrease in the cellular voltage and, hence, energy savings of these electrolytes. This voltage reduction corresponds to the formation enthalpy of the oxy-hydrogen reaction (theoretically 1.23 V, in practice about 0.8 V). Moreover, the overvoltage normally prevailing on this electrode is eliminated.

During an intellectual analysis of the afore-mentioned problems, the below-described relatively simple, inexpensive embodiment of an HDA which, above all, is easy to assemble and maintain has been developed which, basically, also applies to a cathode.

DESCRIPTION OF PREFERRED EMBODIMENTS

The separator which is the separating medium between the gas chamber and the electrolyte, in the electrolysis of metals less noble than hydrogen (e.g. Zn, Cd, Mn, Fe, Ni, Co, Pb, Sn, Ga, In) is not necessarily a membrane, specifically, not an ion-selective membrane. A material that is hydrophilic—i.e. well wetted by aqueous solutions—and thanks to its structure is capillary-active, fulfils a part of the conditions precedent for a suitable separator. For example, a solid cotton fabric, such as nettle or non-impregnated canvas, is a material suitable to successfully separate the gas chamber from the electrolyte without interfereing with the electrolytic conductivity to the catalyst. It has now been found that a felt of asbestos fibers is ideally suitable for that purpose. It exhibits the additional advantage of an absolute temperature and pH resistance in the working sphere of interest. The capillary dimension of usual asbestos felts is so fine that excess hydrogen pressures of up to one atmosphere do not cause a blow-through.

Hence, a rugged and repairable material for the separator had been found. As for the cementation of the separator, catalyst and metal construction renders impossible a destruction-free disassembly of the semi-cell for repair and maintenance purposes, it is desirable to enable the semi-cell, by simple means, to be decomposed and re-assembled. This requirement has been complied with by the employment of structural components of plastic material such as polypropylene, polyacrylonitrile, glass-fiber-reinforced polyester, PVC etc. In respect to the work presently under consideration, polyvinyl chloride (PVC) has been employed as it is easy for one skilled in the art to transfer, mutatis mutandi, the principles of construction to be shown to other suitable materials.

An HDA, in terms of construction, will have to provide the conditions precedent for the material reaction (hydrogen molecule to hydrogen ion) and the material transport. The current flows through a contact means of whatever type—mostly through a lead construction—to the catalyst carrier. The catalyst, normally, is composed of commercial-type conductive graphite fabric coated with commercially available catalysts, normally, on a platinum basis (which is not part of this patent application).

On one side, the catalyst, with the aid of the separator—the asbestos film—is coupled to the electrolyte. On the other side, hydrogen is applied thereto.

A square lead sheet was used as the anode construction to serve as a current conductor. It is placed on an equal-sized PVC plate. Provided on the sheet is a conductive graphite fabric somewhat smaller in size than the lead sheet such that an edge of about 20 mm is formed.

Located on the said fabric is an equal-sized catalyst carrier followed by a plate of asbestos felt having the size of the lead sheet. The laminated construction may be covered by a frame or a perforated PVC plate.

This electrode formed of individual layers is held together by suitable bolts.

The fuel gas, in this arrangement, must overcome the hydrostatic pressure of the electrolyte surrounding the electrode at the lowest point. Normally, technical electrodes plunge to a depth of about 1 to 1.5 m into the electrolyte resulting in a required gas excess pressure of 1.5–2 m water column. The said excess pressure is problematic for the layout of the electrode, especially for the area close to the electrolyte surface. In this area, forces of up to 2000 kg/m$^2$ become effective tending to "blow up" the electrode. These forces can be intercepted by a calculatable number of bolts or rivets.

It has now been found that it is possible to largely forego the bolts once the gas chamber of the electrode is held under a weak vacuum. The required vacuum level is determined by the depth of immersion of the electrode and by the density of the electrolyte, thereby attaining that the electrode is not "blow up" but rather compressed by the hydrostatic pressure. This will meet stability and internal contact of the electrode.

From the rear side of the anode, two lead or plastic tubes are soldered or cemented to the lead sheet. They serve to supply and discharge the fuel gas and to maintain the vacuum. The supply tube is led to the highest point of the working electrode; the discharge line leads away from the deepest point. The tubes are led to the top end of the anode to be connected to the supply and discharge system of the electrolysis.

If it is intended to have the electrode work toward both sides, provision is accordingly made for the same structure on the other side: PVC-plate with integrated gas supply and discharge (identical with the one already installed), lead sheet, graphite fabric, catalyst carrier, asbestos felt and cover plate.

The way of operation of this arrangements is as follows: hydrogen will flow into the chamber ahead of the lead sheet, distributing itself through the graphite fabric throughout the catalyst surface. Through the asbestos felt, via capillary forces—even against a possible excess pressure of the hydrogen—electrolyte is fed into the interior of the cell thereby getting into contact at the catalyst layer, with the hydrogen. The resultant reaction is known from the fuel cell technology and will not be discussed in any detail herein.

The electronic conduit from catalyst to lead electrode is taken up by the graphite fabric also causing the gas distribution.

The asbestos film causing the electrolyte to be coupled to the catalyst, at the same time seals the gas chamber in an ideal manner against gas discharge into the electrolyte.

The electrolyte, of necessity, leaking into the cell, through the gas discharge opening at the lowest point of the cell, is discharged with the excess gas and is separated via a liquid separator.

If it is intended to cathodically separate by such an HDA more noble metals than those corresponding to the standard hydrogen electrode (e.g. Cu, Hg, Ag, Au), certain problems will be encountered. The electrolyte diffusing into the anode chamber contains, for example, copper. In the presence of the catalyst, the hydrogen is able to reduce the copper ion to elementary copper. Gradually, the catalyst is covered by the copper thereby being rendered inactive. Short rinsing of the cell with oxygen or air, with the cell voltage applied, will rapidly separate the copper thereby rendering the catalyst active again. However, a process of this type is not acceptable on an industrial scale.

This problem will be overcome by providing an anionic exchanger membrane ahead of the asbestos separator. It is only the anions, in the majority of cases $SO_4$ ions, that pass through the membrane while the metal ions do not pass into the anode chamber but are rather discharged on the cathode.

If, for a variety of reasons, the use of anionic membranes is not adequate—either for reasons of an excessive voltage drop or for excessive costs involved or for lack of long-time stability—it can be proceeded as follows: A "streching metal" of plastic material is placed as a spacer on the asbestos separator, followed by a second asbestos separator. The whole structure, again, is held together by the screwed-together covering structure.

Through a separate feed-in, in the intermediate chamber of the separators, an excess pressure is maintained with metal ion-free electrolyte (e.g. diluted sulphuric acid) of a few cm water column, thereby insuring that only metal-free electrolyte is fed into the catalyst chamber by the capillary force. The weak excess pressure vis-à-vis the metal-containing electrolyte causes a very poor liquid flow toward the cathode preventing an ingress of metal ions into the intermediate chamber and, hence, into the anode chamber.

A copper recovering electrolysis can be operated with the aid of a cell of this type, by a high iron-containing copper solution which is desirable, for example, in solutions resulting from bio- or pile leaching of the wet-chemical copper recovery. Equally interesting is the copper recovery of copper from high arsenic-containing solutions. When employing the HDA, admittedly, all of the iron and arsenic are reduced to the lowest positive valency stage, but are then not re-oxidized on the anode. Hence, it will also be possible to separate copper electrochemically from such problematic solutions with a calculatable amount of energy.

Another technical end-use application of this HDA is the separation of gold from cyanide-containing gold recovery solutions. An anionic membrane does not prevent the ingress of cyanide ions into the catalyst chamber. However, this would destroy the catalyst. Employment of the afore-described preseparator will preclude a contamination of the platinum in the catalyst with cyanide ions when using, for example Na(OH) as a barrier solution.

EXAMPLE

In a test cell having the dimensions of the active catalyst layer of $8 \times 8$ cm$^2$, against an aluminum sheet of equal size as the cathode, a sulphuric acid (20 gr $H_2SO_4$/l) is electrolyzed with a zinc sulfate saturated solution. In the anode chamber, a vacuum prevailed, 300 mm water column lower than normal pressure. The vacuum was generated by a water-jet pump.

The mechanical construction of the cell was as follows: A lead sheet sized $12 \times 20$ cm$^2$ is provided with a gas supply and discharge line (PVC tube $6 \times 4$ mm) and a sheet of graphite cloth ($8 \times 8$ cm$^2$) and a catalyst fabric of equal size. A 2 cm wide frame corresponding in strength to the fabric and the catalyst carrier is fixed to the lead sheet to prevent a displacement of the individual components from occuring. The whole structure is covered with an asbestos felt plate (12×12 cm²) 2.7 mm strong and is then held together by a PVC frame and 8–4 mm stainless steel bolt.

The whole system is placed into a beaker. The electrolyte by means of a heating panel and a contact thermometer is held at a temperature of 42° C. The measured current and voltage values, through an AD transformer are supplied to, processed by and printed by a computer.

At a current density of 600 A/m², a cellular voltage of 1.5 to 1.6 V was measured. The amount of the cathodically separated zinc corresponded to the amount of current flow within measuring accuracy.

I claim:

1. A vertical overvoltage—eliminating and voltage—gaining fuel gas diffusion electrode assembly of mechanically compressed dismountable sandwich construction for immersion in an aqueous electrolyte solution in an electrolysis cell, said assembly comprising in succession a structural plastic sheet, a metal sheet, a gas chamber containing a graphite fabric, a catalyst bearing carrier and a hydrophilic microporous separator, and said gas chamber comprising gas supply means to the top of the face of said metal sheet in contact with said graphite fabric, discharge means from the deepest point of said catalyst-bearing carrier and control means to hold said gas under a weak vacuum.

2. The method of operating the assembly of claim 1 comprising the steps of immersing said assembly in an aqueous electrolyte solution in an electrolysis cell and supplying gas to, and discharging gas from said assembly from said top to said deepest point under a weak vacuum such that said assembly is under compression by the hydrostatic pressure of said solution.

3. The method of claim 2 wherein the gas contains hydrogen and wherein said assembly is the anode of a metal electrowinning electrolysis cell, said metals being less noble than hydrogen.

4. The method of claim 2 wherein the gas contains oxygen and wherein said assembly is the cathode of a chloralkali electrolysis cell.

5. The method of claim 2 wherein the gas contains hydrogen, wherein said assembly is the anode of a metal winning electrolysis cell, said metal being more noble than hydrogen and wherein said anode is immersed in a metal ion-free auxilary acid electrolyte anolyte solution separated from a metal ion-containing catholyte solution by an ion-permeable diaphhragm on membrane.

* * * * *